(12) United States Patent
Zuo et al.

(10) Patent No.: US 9,494,804 B2
(45) Date of Patent: Nov. 15, 2016

(54) ACTIVE-SHUTTER 3D GLASSES AND OPERATING METHOD THEREOF

(71) Applicants: BOE Technology Group Co., Ltd., Beijing (CN); Chengdu BOE Optoelectronics Technology Co., Ltd., Chengdu (CN)

(72) Inventors: Xiongcan Zuo, Beijing (CN); Junhwan Lim, Beijing (CN); Junrui Zhang, Beijing (CN)

(73) Assignees: BOE Technology Group Co., Ltd., Beijing (CN); Chengdu BOE Optoelectronics Technology Co., Ltd., Chengdu (CN)

(*) Notice: Subject to any disclaimer, the term of this patent is extended or adjusted under 35 U.S.C. 154(b) by 63 days.

(21) Appl. No.: 13/995,920

(22) PCT Filed: Nov. 26, 2012

(86) PCT No.: PCT/CN2012/085271
§ 371 (c)(1),
(2) Date: Jun. 19, 2013

(87) PCT Pub. No.: WO2013/143308
PCT Pub. Date: Oct. 3, 2013

(65) Prior Publication Data
US 2014/0078571 A1 Mar. 20, 2014

(30) Foreign Application Priority Data
Mar. 31, 2012 (CN) .......... 2012 1 0093694

(51) Int. Cl.
*G02F 1/09* (2006.01)
*G02F 1/03* (2006.01)
*G02B 27/26* (2006.01)
*G09G 5/00* (2006.01)
*H04N 13/04* (2006.01)
*G02B 27/22* (2006.01)

(52) U.S. Cl.
CPC .......... *G02B 27/2264* (2013.01); *G02B 27/26* (2013.01); *G02F 1/09* (2013.01); *G02F 1/092* (2013.01); *H04N 13/0438* (2013.01); *H04N 2213/008* (2013.01)

(58) Field of Classification Search
CPC .......... G02B 27/0101; G02B 27/2214; G02B 27/26; G02B 26/001; G02B 27/2228; H04N 13/0438; H04N 9/3197; H04N 13/0409; G02F 1/09; B82Y 20/00
USPC ........ 359/282, 462, 465, 237–238, 245–246, 359/464, 466; 345/7; 348/55, 53
See application file for complete search history.

(56) References Cited

U.S. PATENT DOCUMENTS 3,840,695 A * 10/1974 Fischer .......................... 348/761
2002/0158967 A1* 10/2002 Janick et al. ................... 348/87

(Continued)

FOREIGN PATENT DOCUMENTS

| CN | 101272033 A | 9/2008 |
|---|---|---|
| CN | 201490564 U | 5/2010 |

(Continued)

OTHER PUBLICATIONS

Written Opinion of the International Searching Authority dated Mar. 14, 2013 issued by the State Intellectual Property Office of the People's Republic of China in connection with PCT counterpart application, International Application No. PCT/CN2012/085271.

(Continued)

*Primary Examiner* — Dawayne A Pinkney (57) ABSTRACT

An active-shutter 3D glasses and an operating method thereof, the active-shutter 3D glasses comprises: a frame comprising temples; left and right magneto-optical eyeglasses, supported by the frame, and comprising left and right transparent mediums and left and right rear polarizers, respectively; a magnetic field apparatus, located outside the left and right magneto-optical eyeglasses, and providing the left and right magneto-optical eyeglasses with a magnetic field which causes polarization planes of polarized light entering the left and right magneto-optical eyeglasses to rotate; and a signal module, connected with the magnetic field apparatus, and providing a electric-current signal to the magnetic field apparatus so that the magnetic field corresponds to the electric-current signal.

13 Claims, 6 Drawing Sheets

(56) References Cited

U.S. PATENT DOCUMENTS

| | | | |
|---|---|---|---|
| 2005/0201705 A1* | 9/2005 | Ellwood, Jr. | D03D 25/005 385/129 |
| 2009/0046222 A1* | 2/2009 | Miner et al. | 349/69 |
| 2010/0225751 A1* | 9/2010 | Nemeth | 348/58 |
| 2010/0238274 A1 | 9/2010 | Kim et al. | |
| 2011/0037836 A1 | 2/2011 | Chang | |
| 2011/0149018 A1* | 6/2011 | Kroll et al. | 348/40 |
| 2011/0157333 A1 | 6/2011 | Lee et al. | |
| 2011/0222154 A1* | 9/2011 | Choi et al. | 359/464 |
| 2011/0234774 A1 | 9/2011 | Satoh et al. | |
| 2011/0255160 A1 | 10/2011 | Lee et al. | |
| 2011/0285830 A1 | 11/2011 | Kim et al. | |
| 2012/0050628 A1 | 3/2012 | Cho et al. | |
| 2012/0098931 A1* | 4/2012 | Wirtz | 348/43 |
| 2014/0078571 A1 | 3/2014 | Zuo et al. | |

FOREIGN PATENT DOCUMENTS

| | | |
|---|---|---|
| CN | 201637935 U | 11/2010 |
| CN | 101995692 A | 3/2011 |
| CN | 102088615 A | 6/2011 |
| CN | 102116961 A | 7/2011 |
| CN | 102200645 A | 9/2011 |
| CN | 201974539 U | 9/2011 |
| CN | 102253350 A | 11/2011 |
| CN | 102253516 A | 11/2011 |
| CN | 202057931 U | 11/2011 |
| CN | 102323673 A | 1/2012 |
| CN | 102356638 A | 2/2012 |
| CN | 102387382 A | 3/2012 |
| CN | 102650746 A | 8/2012 |
| EP | 2378784 A1 | 10/2011 |
| GB | 466047 | 5/1937 |
| KR | 101055560 B1 | 8/2011 |
| KR | 20110114925 A | 10/2011 |
| WO | 7901035 | 11/1979 |
| WO | 2011089538 A1 | 7/2011 |

OTHER PUBLICATIONS

English translation of Written Opinion of the International Searching Authority dated Mar. 14, 2013 issued by the State Intellectual Property Office of the People's Republic of China in connection with PCT counterpart application, International Application No. PCT/CN2012/085271.

English machine translation of Chinese Patent Document No. CN 202057931 U, from machine translation feature of SIPO.

English machine translation of Chinese Patent Document No. CN 102088615 A, from machine translation feature of LexisNexis TotalPatent.

English machine translation of Chinese Patent Document No. CN 201490564 U, from machine translation feature of SIPO.

English translation of CN102387382A, 20 pages.

English translation of CN102356638A, 20 pages.

English translation of CN102323673A, 10 pages.

English translation of CN102253516A, 15 pages.

English translation of CN10225350A; 3 pages.

English translation of CN102200645A; 3 pages.

English translation of CN201974539U; 14 pages.

English translation of CN102116961A; 20 pages.

English Abstract of CN101995692A; 1 page.

English translation of CN201637935U; 15 pages.

First Office Action dated Jul. 1, 2013 issued by State Intellectual Property Office of the People's Republic of China in connection with Chinese counterpart application, Chinese National Application No. 201210093694.9.

English translation of First Office Action dated Jul. 1, 2013 issued by State Intellectual Property Office of the People's Republic of China in connection with Chinese counterpart application, Chinese National Application No. 201210093694.9.

International Search Report of the International Searching Authority dated Mar. 14, 2013 issued by the State Intellectual Property Office of the People's Republic of China in connection with PCT counterpart application, International Application No. PCT/CN2012/085271.

English translation of International Search Report of the International Searching Authority dated Mar. 14, 2013 issued by the State Intellectual Property Office of the People's Republic of China in connection with PCT counterpart application, International Application No. PCT/CN2012/085271.

English machine translation of Chinese Patent Document No. CN 101272033 A.

English machine translation of Chinese Patent Document No. CN 102650746 A.

* cited by examiner

ACTIVE-SHUTTER 3D GLASSES AND OPERATING METHOD THEREOF

CROSS REFERENCE TO RELATED APPLICATIONS

This application is based on International Application No. PCT/CN2012/085271 filed on Nov. 26, 2012, which claims priority to Chinese National Application No. 201210093694.9, filed on Mar. 31, 2012, the contents of which are incorporated herein by reference.

FIELD OF THE INVENTION

Embodiments of the present invention relate to an active-shutter 3D glasses and an operating method thereof.

BACKGROUND OF THE INVENTION

At present, an active-shutter 3D glasses on the market comprises left and right eyeglasses formed of liquid crystal screens that can be opened and shut respectively. The opening and shutting of the left and right eyeglasses are achieved by controlling the twisting and rotating of liquid crystal molecules in the liquid crystal screens of the left and right eyeglasses and thus changing a polarization plane of light. An operating procedure of such an 3D glasses is as follows: a display screen alternately displays a left-eye picture and a right-eye picture, and when the left-eye picture is displayed by the display screen, the left liquid crystal screen eyeglass of the 3D glasses is in an open state, while the right liquid crystal screen eyeglass is in a shut state, therefore only a left eye of a user can see the picture; correspondingly, when the right-eye picture is displayed by the display screen, the left liquid crystal screen eyeglass of the 3D glasses is in the shut state, while the right liquid crystal screen eyeglass is in the open state, therefore only a right eye of the user can see the picture. In this way, pictures are alternately seen by the left and the right eyes, and a 3D image is thus generated by synthesizing the two pictures within the brain.

In the use of the above-mentioned 3D glasses to view a 3D video/image, because the 3D glasses has liquid crystal encapsulated in its liquid crystal screen eyeglasses, when the 3D glasses is under effect of an external force and thus damaged in its outer glass layer or sealing material, the originally sealed liquid crystal may leak out, causing a threat to the safety of the user. Also, after a long period of use or under effect of external environment temperature, phenomena such as leakage and improper operation of the liquid crystal molecules may occur. In addition, due to the structure of the liquid crystal screen eyeglass, the 3D glasses is thick and heavy, which reduces the comfort level of the user wearing the glasses. Moreover, when the 3D glasses is tilted, a normal viewing effect of a 3D video/image may be influenced.

SUMMARY OF THE INVENTION

Embodiments of the present invention provide an active-shutter 3D glasses and an operating method thereof, which allow a user to view a 3D video/image safely and comfortably.

An embodiment of the present invention provides an active-shutter 3D glasses, which comprises: a frame, comprising temples; left and right magneto-optical eyeglasses, supported by the frame, and comprising left and right transparent mediums and left and right rear polarizers, respectively; a magnetic field apparatus, located outside the left and right magneto-optical eyeglasses, and providing the left and right magneto-optical eyeglasses with a magnetic field which causes polarization planes of polarized light entering the left and right magneto-optical eyeglasses to rotate; and a signal module, connected with the magnetic field apparatus, and providing a electric-current signal to the magnetic field apparatus so that the magnetic field corresponds to the electric-current signal, wherein the generated magnetic field causes the polarization planes of the polarized light entering the left and right transparent mediums to rotate, respectively.

Optionally, at a first moment, the polarized light entering the transparent medium of one of the left and right magneto-optical eyeglasses passes through its corresponding rear polarizer, whereas the polarized light entering the other transparent medium can not pass through its corresponding rear polarizer; and at a second moment just subsequent to the first moment, the polarized light entering the transparent medium whose corresponding rear polarizer the polarized light at a previous moment passed through is not allowed to pass through its corresponding rear polarizer, whereas the polarized light entering the transparent medium whose corresponding rear polarizer the polarized light at the previous moment could not pass through is allowed to pass through its corresponding rear polarizer.

An embodiment of the present invention provides a operating method of the above-described active-shutter 3D glasses, and the method comprises: step 101, the signal module provides an electric-current signal to the magnetic field apparatus; step 102, the magnetic field apparatus generates a magnetic field corresponding to the electric-current signal; and step 103, the generated magnetic field causes the polarization planes of the polarized light entering the left and right transparent mediums to rotate, respectively.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION OF THE PREFERRED EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
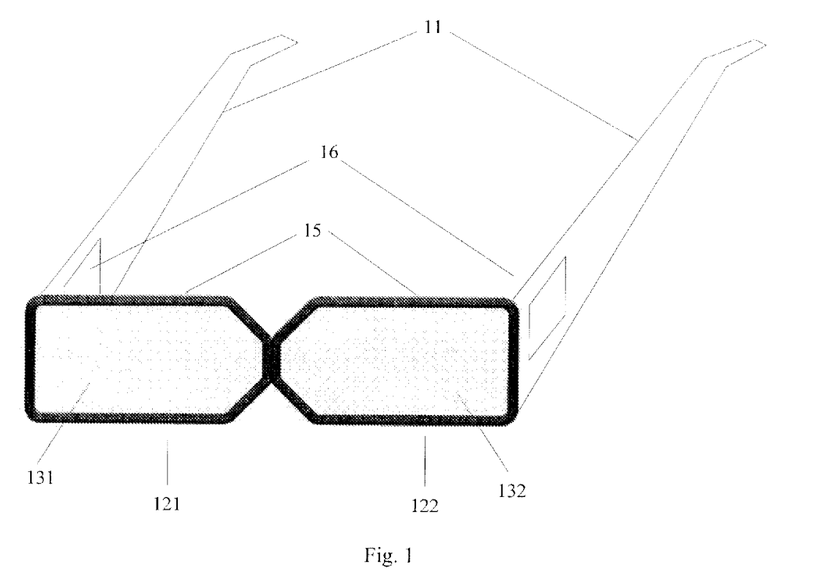
FIG. 1 is a schematic configuration diagram of an active-shutter 3D glasses provided by an embodiment of the present invention.

An embodiment of the present invention provides an active-shutter 3D (Three Dimensional) glasses, as shown in FIG. 1, comprising: a frame 11, left and right magneto-optical eyeglasses 121,122 supported by the frame 11, a magnetic field apparatus 15 and a signal module 16, in which the left and right magneto-optical eyeglasses 121,122 comprise left and right transparent mediums 131,132 and left and right rear polarizers, respectively.

It should be noted that, the left and right magneto-optical eyeglasses 121,122 are described with regard to left and right eyes of a user, which may be two eyeglasses independent from each other, also may be an eyeglass formed integrally or connected with each other. Accordingly, the transparent mediums and the rear polarizers, respectively, may be independent from each other, also may be formed integrally or connected with each other. The embodiment of the present invention is not limited in this regard. For example, the left and right magneto-optical eyeglasses 121, 122 shown in FIG. 1 are two identical hexagonal eyeglasses, but also may be two eyeglasses in other shapes, same or different; the embodiment of the invention is not limited to the specific shapes of the eyeglasses and whether or not the shapes of the two eyeglasses are the same. The transparent mediums are mediums that can allow light to pass through and cause a polarization plane of a polarized light entering therein to rotate in a magnetic field, and may be magnetic mediums, also may be non-magnetic mediums.

The signal module 16 is located on the frame 11; the magnetic field apparatus 15 is located outside the left and right magneto-optical eyeglasses 121,122; the signal module 16 is connected with the magnetic field apparatus 15; the left and right rear polarizers are, respectively, located at rear sides of the left and right transparent mediums 131,132 in a entering direction of the polarized light, i.e., sides close to human eyes.

The signal module 16 may be specifically provided on temples 111, 112 of the frame 11, as shown in FIG. 1. Depending on requirement and specific circumstance of the glasses, it is also possible for the signal module 16 to be provided on the frame, the temples, or nose pads of the frame 11, or on any other component; the embodiment of the present invention is not limited in this regard. As an example, the magnetic field apparatus 15 may be specifically located outside the peripheries of the left and right magneto-optical eyeglasses 121,122, and tightly surrounds the left and right magneto-optical eyeglasses 121,122, as shown in FIG. 1. Depending on actual requirements, the magnetic field apparatus 15 also may be provided outside the left and right magneto-optical eyeglasses 121,122 with a certain gap from the left and right magneto-optical eyeglasses 121,122, and may be provided surroundingly or in any other manner; the embodiment of the present invention is not limited to the specific location of the magnetic field apparatus 15, as long as the magnetic field apparatus 15 can provide the left and right magneto-optical eyeglasses with a sufficient magnetic field that causes a polarization plane of the polarized light to rotate.

The magnetic field apparatus 15 generates a magnetic field corresponding to an electric-current signal provided thereto; and this procedure complies with the law of electromagnetic induction. Alternatively, the electric-current signal is a pulsed electric-current signal. Of course, it is also possible to use any other electric-current signal that can provide a required corresponding magnetic field; the embodiment of the present invention is not limited to the specific form of the electric-current signal, which can be selected according to an actual situation.

The magnetic field causes the polarization plane of the polarized light to rotate, based on the Faraday magneto-optical rotation effect. The Faraday magneto-optical rotation effect refers to a phenomenon that the polarization plane of polarized light when passing through a medium is caused to rotate under a magnetic field. The rotation angle of the polarization plane of the polarized light can be expressed as $\theta(\omega)=V(\omega)BL$, where $\omega$ is the frequency of the polarized light, B is the magnetic field intensity, L is the propagation distance of the polarized light in the medium, i.e., the medium thickness, and $V(\omega)$ is the Verdet constant of the medium. The Faraday magneto-optical rotation effect can occur in some certain magnetic mediums or non-magnetic mediums. A Faraday rotation angle in a magnetic medium is much larger than that in a non-magnetic medium. The skilled in the art can specifically select a magnetic or non-magnetic medium according to a desired Faraday rotation angle; and the embodiment of the present invention is not limited in this regard. When $V(\omega)>0$, the polarization plane of linearly polarized light rotates left-handedly, whereas when $V(\omega)<0$, the polarization plane of the linearly polarized light rotates right-handedly. Whether the polarization plane of the linearly polarized light rotates left-handedly or right-handedly, it is equally applicable to an embodiment of the present invention.

The signal module 16 provides a electric-current signal to the magnetic field apparatus 15, so that the magnetic field apparatus 15 generates a magnetic field corresponding to the electric-current signal; the generated magnetic field causes the polarization planes of the polarized light entering the left and right transparent mediums 131,132 to rotate, respectively, so that at the same moment, the polarized light entering one of the left and right transparent mediums passes through its corresponding rear polarizer, whereas the polarized light entering the other of the left and right transparent mediums can not pass through its corresponding rear polarizer, and at the next moment, the polarized light entering the transparent medium whose corresponding rear polarizer the polarized light at a previous moment passed through is not allowed to pass through its corresponding rear polarizer, whereas the polarized light entering the transparent medium whose corresponding rear polarizer the polarized light at a previous moment can not be passed through is allowed to pass through its corresponding rear polarizer, and then the above-described process is alternately repeated.

The polarized light entering the left and right transparent mediums 131,132 refers to the polarized light of a 3D video/image that is synchronously displayed on a 3D video/image display device viewed by a user. Specifically, at a certain moment, the generated magnetic field allows the polarized light entering the left transparent medium 131 to pass through a left rear polarizer 141, but does not allow the polarized light entering the right transparent medium 132 to pass through a right rear polarizer 142. At this moment, the polarized light can pass through the left magneto-optical eyeglass, but can not pass through the right magneto-optical eyeglass; and at this moment, the left eye of a user can see a left-eye picture that is synchronously displayed on a 3D video/image display device, whereas the right eye can not see the left-eye picture, that is to say, at this moment, the left magneto-optical eyeglass 121 is open, whereas the right magneto-optical eyeglass 122 is shut. At the next moment, the generated magnetic field does not allow the polarized light entering the left transparent medium 131 to pass through the left rear polarizer 141, but allows the polarized light entering the right transparent medium 132 to pass through the right rear polarizer 142. At this moment, the right magneto-optical eyeglass 122 is open, whereas the left magneto-optical eyeglass 121 is shut. The right eye of the user can view a right-eye picture that is synchronously displayed on a 3D video/image display device, whereas the left eye can not view the right-eye picture. Then, by alternately repeating the optical rotation processes corresponding to the two moments as described above, the user can see a continuous 3D video/image.

Here, it should be noted that, in the embodiment of the present invention, the time interval between a certain moment displaying a left-eye picture and the next moment displaying a right-eye picture, is not greater than a visual persistence time of a human eye.

In the above-described procedure, firstly, the left magneto-optical eyeglass 121 is opened and the right magneto-optical eyeglass 122 is shut, then the left magneto-optical eyeglass 121 is shut and the right magneto-optical eyeglass 122 is opened; and then the above procedure is repeated in this order, and since the whole procedures are alternately repeated, it is also possible to be performed in such an order as follows: firstly, the left magneto-optical eyeglass 121 is shut and the right magneto-optical eyeglass 122 is opened, then the left magneto-optical eyeglass 121 is opened and the right magneto-optical eyeglass 122 is shut. The embodiment of the present invention is not limited in this regard.

By way of example, the magnetic field apparatus comprises left and right magnetic field apparatuses, which provide magnetic fields for the left and right magneto-optical eyeglasses respectively, and accordingly, the signal module comprises left and right signal modules, which provide electric-current signals to the left and right magnetic field apparatuses respectively.

It should be noted that, in order to allow a user to normally see a continuous 3D video/image, a varying frequency of the electric-current signal provided by the signal module 16 to the magnetic field apparatus 15, has a proportional relationship with the screen refresh rate of the 3D video/image display device, so as to achieve that the opening and shutting of the left and right magneto-optical eyeglasses of the 3D glasses are performed synchronously with the pictures displayed on the 3D video/image display device, so that when a left-eye picture is displayed, the left magneto-optical eyeglass is opened and the right magneto-optical eyeglass is shut, and when a right-eye picture is displayed, the right magneto-optical eyeglass is opened and the left magneto-optical eyeglass is shut. A synchronous control technique of the signal module of the 3D glasses may be specifically referred to the related contents in the prior art, which is no more described in the embodiment of the present invention.

Alternatively, a varying frequency of the electric-current signal provided by the signal module 16 to the magnetic field apparatus 15, equals to the screen refresh rate of the 3D video/image display device.

With the active-shutter 3D glasses provided by the embodiment of the present invention, according to an electric-current signal provided by the signal module 16, the magnetic field apparatus 15 generates a corresponding magnetic field, which causes the polarization planes of the polarized light entering the left and right transparent mediums 131,132 to rotate, respectively, so that at the same moment, one of the eyeglasses is light transmissive while the other is non-light-transmissive, and at the next moment, the eyeglass which was light-transmissive at a previous moment is non-light-transmissive while the eyeglass which was non-light-transmissive at the previous moment is light-transmissive; thus, by alternately repeating the above-described process, a 3D display effect is achieved. Compared with the prior art in which an optical rotation is performed by liquid crystal molecules in liquid crystal screen eyeglasses, the present invention achieves a 3D display by utilizing a magneto-optical rotation effect, so that the active-shutter 3D glasses has a simple structure and does not need to encapsulate liquid crystal; therefore, it has a higher safety and higher comfort level, offering a user a better 3D effect.

Alternatively, in one embodiment provided by the present invention, as shown in FIG. 1, the left and right transparent mediums 131,132 are transparent mediums having a predetermined Verdet constant. In an embodiment of the present invention, the absolute value of $V(\omega)$ of the material of the left and right transparent mediums is greater than 0.3 min/(Oe·cm). The Faraday magneto-optical rotation effect can occur both in magnetic mediums and non-magnetic mediums; however, a rotation angle of the polarization plane of the polarized light in a magnetic medium is much larger than that in a non-magnetic medium. According to the formula $\theta(\omega)=V(\omega)BL$, a rotation angle has relationships with Verdet constant $V(\omega)$, magnetic field intensity B and transparent medium thickness L; a transparent medium with a relatively high Verdet constant is selected, so that the magnetic field intensity B and the medium thickness L can be relatively reduced, and according to the law of electromagnetic induction, it is possible to use a relatively small electric-current signal and a relatively thin transparent medium to achieve the rotation of the polarization plane of the polarized light.

By using the transparent medium with a relatively high Verdet constant, it is possible to select a relatively small electric-current signal and a relatively thin transparent medium; therefore, the embodiment of the present invention can further obtain the 3D glasses with low power consumption and small weight.

Alternatively, in the embodiment provided by the present invention, the transparent medium may be a transparent magneto-optical glass, a transparent diluted magnetic semiconductor thin film, or a transparent magneto-optical thin film.

The magneto-optical glass has good isotropy, which can further improve the display effect of the 3D glasses; the transparent diluted magnetic semiconductor thin film and transparent magneto-optical thin film have excellent magneto-optical performance, and are in a thin-film configuration, which can further reduce the weight of the 3D glasses.

Alternatively, in another embodiment provided by the present invention, the magnetic field apparatus comprises coils, namely, left and right coils; the left coil is surroundingly placed outside the periphery of the left magneto-optical eyeglass 121, and the right coil is surroundingly placed outside the periphery of the right magneto-optical eyeglass 122. According to the electromagnetic theory, the energized coil can produce thereinside a magnetic field which is uniformly distributed and uniform in orientation and intensity; the magnetic field can cause the polarization plane of polarized light passing through a transparent medium to uniformly rotate a desired angle. The coil may be formed by multi-winding fine conductive wire, thus, has a certain mechanical strength, and the coil can act as the external frame at an outside peripheral of the left and right magneto-optical eyeglasses 121, 122.

The magnetic field generated by the magnetic field apparatus by means of the coils, is uniformly distributed and uniform in orientation and intensity, and has a good optical rotation effect; moreover, the coils may be surroundingly placed outside the peripheries of the magneto-optical eyeglasses to function as the frame, thus there is no need to provide a frame additionally, thereby allowing the active-shutter 3D glasses to have a better 3D display effect and a more compact configuration.

Alternatively, in order to overcome a disadvantage in the prior art that an 3D glasses can only be used to horizontally watch a 3D video/image but can not be used to obliquely watch a 3D video/image, the active-shutter 3D glasses provided by one embodiment of the present invention further comprises an infrared sensing transmitter and an infrared sensing receiver; the infrared sensing receiver is connected with the signal module; the infrared sensing transmitter transmits infrared light in a predetermined direction, and the infrared sensing receiver receives the transmitted infrared light, and according to the transmitting position and the receiving position of the infrared light, obtains a tilt angle, and feeds the tilt angle to the signal module, so that the signal module adjusts the electric-current signal according to the tilt angle, so as to cause the magnetic field apparatus to change the magnetic field. The magnetic field consequently causes the polarization plane of the polarized light entering the transparent medium to rotate. At this time, the rotation angle of the polarization plane of the polarized light is a Faraday rotation angle which can compensate for the tilt angle of the 3D glasses, so that the polarization plane of the polarized light is caused to rotate to an orientation actually needed.

The infrared sensing transmitter may have one or more transmitting points, for transmitting the infrared light in a predetermined direction, and being provided on the 3D glasses; the number and specific locations of the transmitting points can be set according to an actual situation, and the embodiment of the present invention is not limited in this regard. The infrared sensing receiver may have a plurality of receiving points, for receiving the infrared light transmitted in a predetermined direction; the specific number and locations of the receiving points should be appropriate to ensure that when the 3D glasses is tilted, the infrared light transmitted in a predetermined direction can be received by a certain receiving point. The infrared sensing transmitter transmits the infrared light in a predetermined direction through a transmitting point, and the predetermined direction may be a preset horizontal direction, a vertical direction or any other direction. When the 3D glasses is tilted, regardless of the tilt angle of the 3D glasses, the infrared sensing transmitter maintains the predetermined direction of transmitting infrared light unchanged. The infrared light transmitting position and receiving position, i.e., the positions of the transmitting point and receiving point, together correspond to a unique tilt angle; thus, through the infrared light transmitting position and receiving position, the tilt angle of the 3D glasses can be uniquely determined. Due to the tilt of the directions of the light-transmitting axes of the left and right rear polarizers, there is a deviation between an actual rotation angle of the polarization plane of the incident polarized light and the rotation angle thereof that is caused by the magnetic field generated by the magnetic field apparatus according to a original electric-current signal; a angle of the deviation is exactly the tilt angle. Therefore, the infrared sensing receiver feeds the obtained tilt angle to the signal module, so that the signal module adjusts the electric-current signal according to the actual position of the 3D glasses, and consequently, the generated magnetic field causes the polarization plane of the incident polarized light to rotate to an orientation actually needed.

By utilizing the infrared light transmitting and receiving positions of the infrared sensing transmitter and receiver on the 3D glasses to uniquely determine a tilt angle of the 3D glasses, and feeding the tilt angle to the signal module, the magnetic field can, based on the actual position of the 3D glasses, cause the polarization plane of the incident polarized light to rotate, so as to accomplish a 3D display; in this way, the 3D glasses when tilted can still allow a user to normally watch a 3D video/image, thereby enhancing user experience.

Alternatively, in an embodiment of the active-shutter 3D glasses provided by the present invention, the left or the right magneto-optical eyeglass comprises a flat and straight edge; the infrared sensing transmitter is provided on the flat and straight edge, and the infrared sensing receiver is arranged on any other edge of the left or the right magneto-optical eyeglass except for the flat and straight edge. Because light travels in a straight line in a uniform medium, if the 3D glasses is tilted to make the transmitted infrared light to be coincident with the flat and straight edge, the receiving point of the infrared-sensing receiver provided at the other edge connected with the flat and straight edge receives the infrared light at a connecting point of the other edge and the flat and straight edge.

By utilizing the geometric property of the flat and straight edge and the principle of rectilinear propagation of light, the 3D glasses does not need to provide a receiving point at the flat and straight edge where the infrared sensing transmitter locates; this simplifies the structure of the 3D glasses and saves power.

In order to better explain the active-shutter 3D glasses provided by the embodiment of the present invention, hereinafter an explanation will be given in detail by using a specific example.

Figure 2:
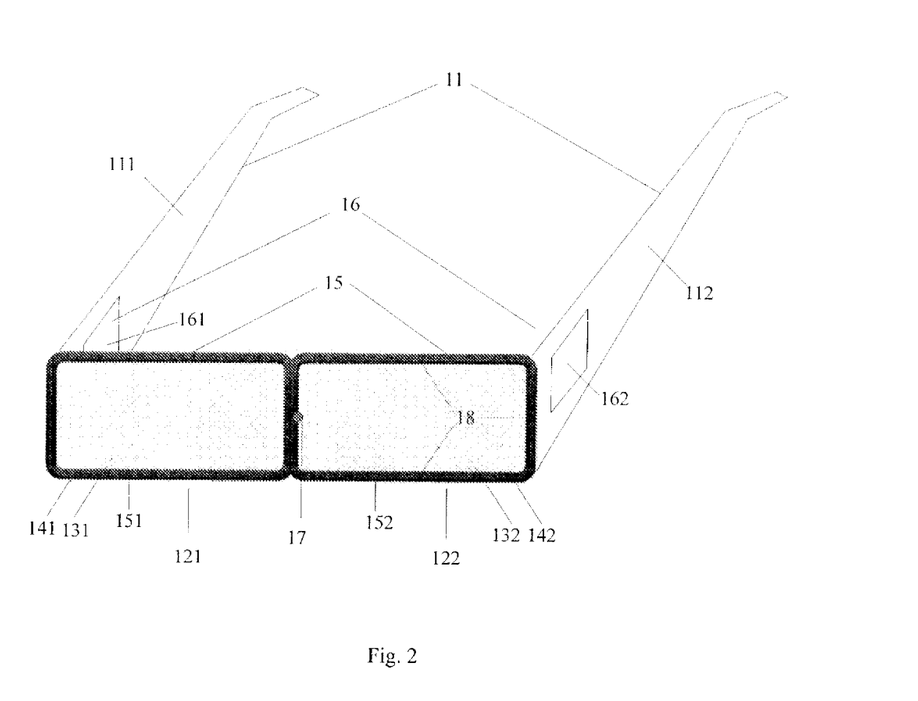
FIG. 2 is a schematic configuration diagram of another pair of active-shutter 3D glasses provided by an embodiment of the present invention.
Figure 3:
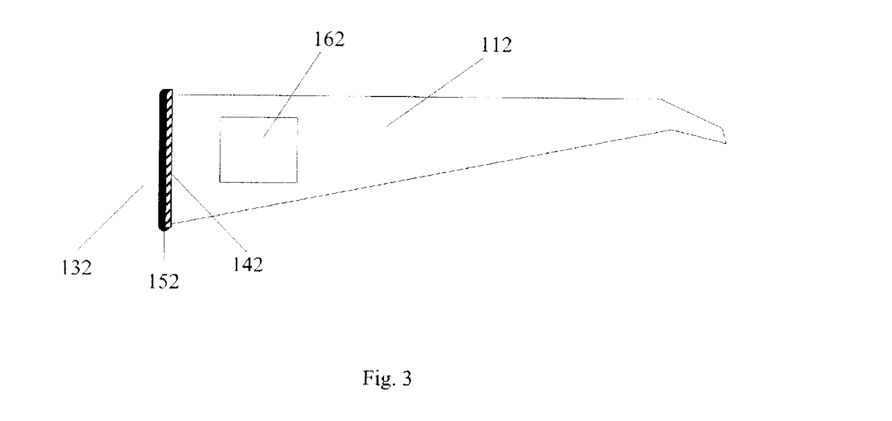
FIG. 3 is a right view of the active-shutter 3D glasses shown in FIG. 2.

The embodiment of the present invention provides an active-shutter 3D glasses, as shown in FIG. 2 and FIG. 3, comprising: a frame 11, left and right magneto-optical eyeglasses 121,122, a magnetic field apparatus 15, a signal module 16, an infrared sensing transmitter 17, and an infrared sensing receiver 18. The frame 11 comprises left and right temples 111,112; the left and right magneto-optical eyeglasses 121,122 comprise left and right transparent magneto-optical thin films 131,132 and left and right rear polarizers 141,142, respectively; the signal module 16 comprises a left signal module 161 and a right signal module 162.

The left and right magneto-optical eyeglasses 121,122 are identical eyeglasses with a regular, rectangular shape. The light-transmitting axes of the left and right rear polarizers 141,142 are in a vertical direction. The magnetic field apparatus 15 comprises left and right coils 151,152, which are provided outside the peripheries of the left and right magneto-optical eyeglasses 121,122, and tightly surrounds the left and right magneto-optical eyeglasses 121,122. The left signal module 161 and the right signal module 162 are respectively located on the left and right temples 111,112, and respectively connected with the left and right coils 151,152. The left and right rear polarizers 141,142 are, respectively, located at a side opposite to an entering side of the polarized light of the left and right transparent magneto-optical thin films 131,132, i.e., a side close to human eyes. The infrared sensing transmitter 17 has a transmitting point provided at an middle part on a left edge of the right coil 152; the infrared sensing receiver 18 has receiving points evenly distributed on an upper edge, a right edge and a lower edge of the right coil 152.

Figure 4A:
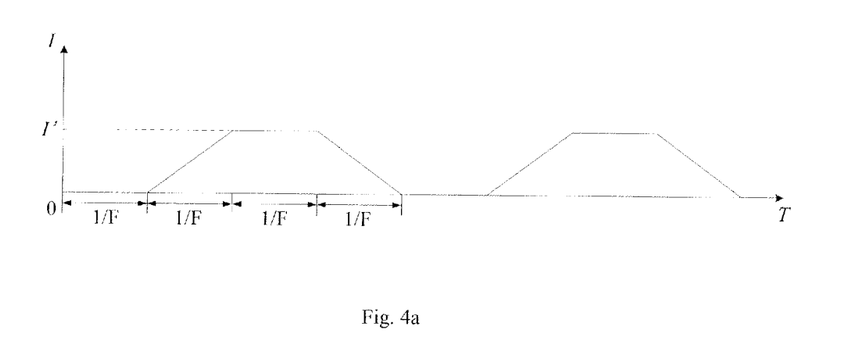
FIG. 4a is a pulsed electric-current signal provided by a left signal module of the active-shutter 3D glasses shown in FIG. 2.
Figure 4B:
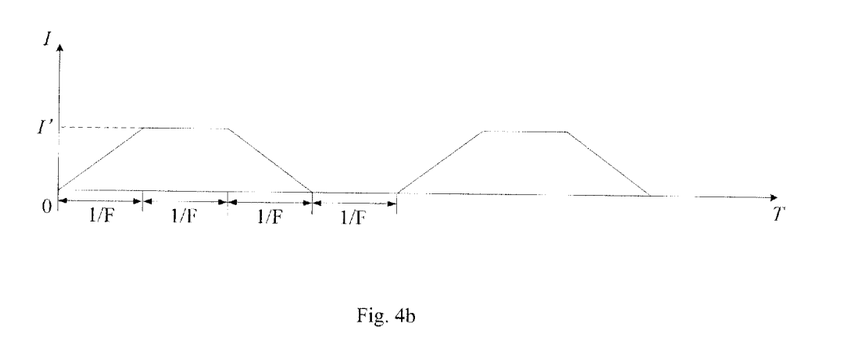
FIG. 4b is a pulsed electric-current signal provided by a right signal module of the active-shutter 3D glasses shown in FIG. 2.

The left signal module 161 and the right signal module 162 provide pulsed electric-current signals to the left and right coils 151,152, respectively, as shown in FIGS. 4a and 4b; FIGS. 4a and 4b illustrate the pulsed electric-current signals provided by the left and right signal modules 161, 162 to the left and right coils 151,152, respectively. In this embodiment, the screen refresh rate of a 3D video/image display device is denoted as F, and the direction of the incident polarized light is a vertical direction. In order to ensure that the pictures seen by human eyes are accurately synchronized with the pictures displayed on the display screen, the varying frequency of the pulsed electric-current signals is set to F/4.

Figure 5A:
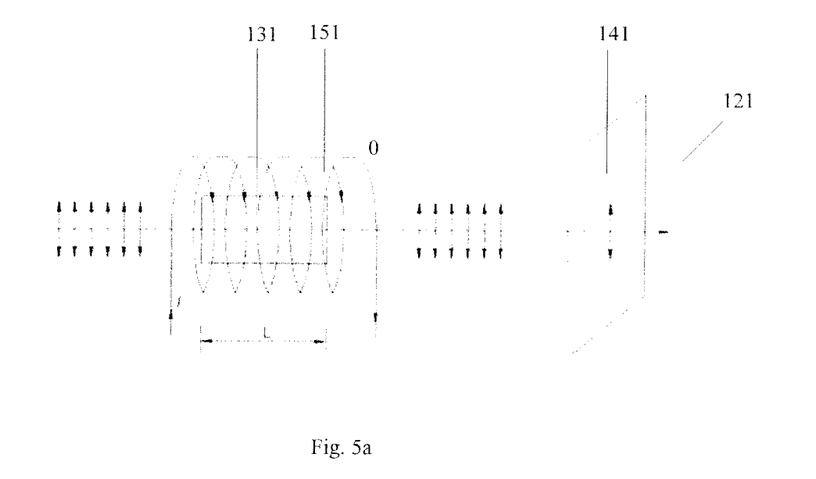
FIG. 5a is a schematic diagram illustrating a principle of a left magneto-optical eyeglass of the active-shutter 3D glasses shown in FIG. 2 in a first 1/F frame time.
Figure 5B:
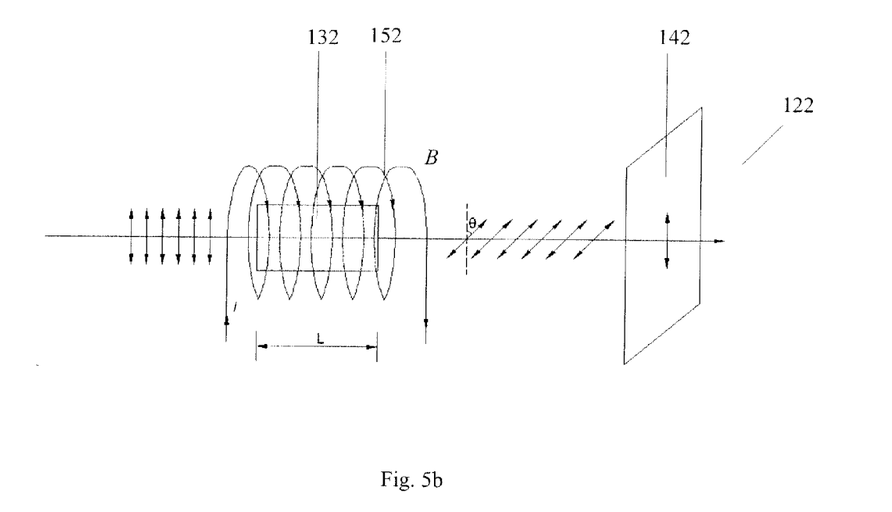
FIG. 5b is a schematic diagram illustrating a principle of a right magneto-optical eyeglass of the active-shutter 3D glasses shown in FIG. 2 in the first 1/F frame time.

As shown in FIG. 4a, in a first 1/F frame time, since the pulsed electric-current signal provided by the left signal module 161 is 0, the left coil 151 now does not generate thereinside an induced magnetic field, thus the polarization plane of incident vertically-directed polarized light is not rotated when passing through the left transparent magneto-optical thin film 131 of thickness L, therefore as shown in FIG. 5a, the vertically-directed polarized light passes through the left rear polarizer 141, that is, now the left magneto-optical eyeglass 121 is light-transmissive (open); as shown in FIG. 4b, in the first 1/F frame time, since the pulsed electric-current signal provided by the right signal module 161 is changed from 0 to I', the right coil 152 now induces thereinside a magnetic field B, causing the polarization plane of the incident vertically-directed polarized light to rotate 90°, as shown in FIG. 5b, represented by θ, thus the vertically-directed polarized light is changed into horizontally-directed polarized light when passing through the right transparent magneto-optical thin film 132 of thickness L, therefore it can not pass through the right rear polarizer 142, that is, now the right magneto-optical eyeglass 122 is non-light-transmissive (shut).

Figure 6A:
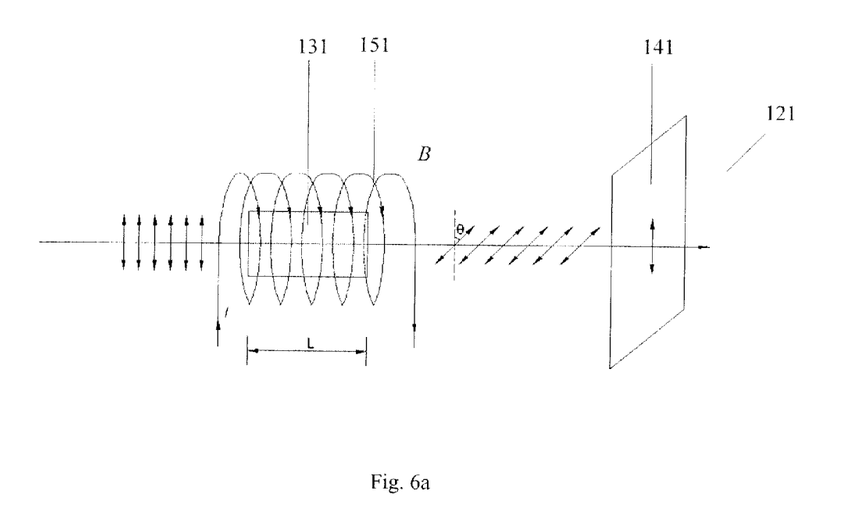
FIG. 6a is a schematic diagram illustrating a principle of the left magneto-optical eyeglass of the active-shutter 3D glasses shown in FIG. 2 in a second 1/F frame time.
Figure 6B:
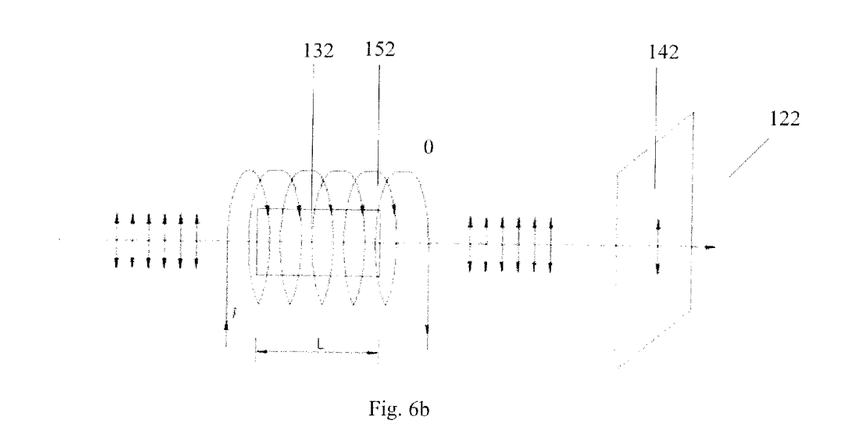
FIG. 6b is a schematic diagram illustrating a principle of the right magneto-optical eyeglass of the active-shutter 3D glasses shown in FIG. 2 in the second 1/F frame time.

As shown in FIG. 4a, in a second 1/F frame time, since the pulsed electric-current signal provided by the left signal module 161 is changed from 0 to I', the left coil 151 now induces thereinside a magnetic field B, causing the polarization plane of the incident vertically-directed polarized light to rotate 90°, as shown in FIG. 6a, represented by θ, thus the vertically-directed polarized light is changed into horizontally-directed polarized light when passing through the left transparent magneto-optical thin film 131 of thickness L, therefore it can not pass through the left rear polarizer 141, that is, now the left magneto-optical eyeglass 121 is non-light-transmissive (shut); as shown in FIG. 4b, in the second 1/F frame time, since the pulsed electric-current signal provided by the right signal module 162 is I' and kept unchanged, the right coil 152 now does not generate thereinside an induced magnetic field, thus the polarization plane of the incident vertically-directed polarized light is not rotated when passing through the right transparent magneto-optical thin film 132 of thickness L, as shown in FIG. 6b, therefore the vertically-directed polarized light passes through the right rear polarizer 142, that is, now the right magneto-optical eyeglass 122 is light-transmissive (open). Four successive 1/F frame time constitute a cycle of the pulsed electric-current signal. Based on the analogy of the above procedure, by alternately repeating the procedure that the left magneto-optical eyeglass 121 is opened while the right magneto-optical eyeglass 122 is shut and then the left magneto-optical eyeglass 121 is shut while the right magneto-optical eyeglass 122 is opened, a user can see a continuous 3D video/image.

Figure 7:
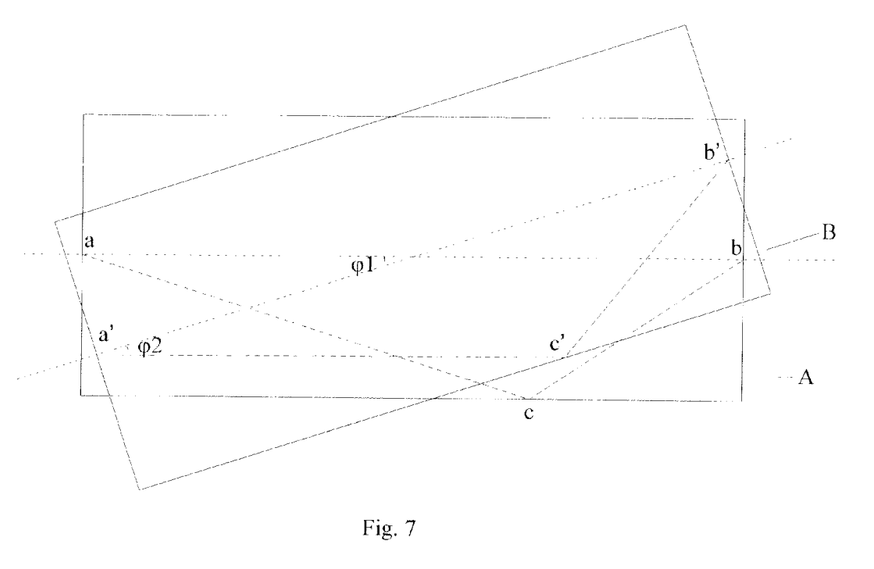
FIG. 7 is a schematic diagram illustrating a rotation of the right magneto-optical eyeglass of the active-shutter 3D glasses shown in FIG. 2.

When the 3D glasses is tilted, as shown in FIG. 7 which illustrates a schematic diagram of the right magneto-optical eyeglass 122 after rotated, A represents the eyeglass placed horizontally, B represents the eyeglass tilted, and a represents a transmitting point of the infrared sensing transmitter 17, which is provided at a middle part on a left edge of the eyeglass, and is represented by a' after tilted; b represents a midpoint on a right edge of the eyeglass, which is represented by b' after tilted. A rotation angle of the horizontal central axis ab represents a tilt angle of the eyeglass, i.e., a tilt angle of the 3D glasses. As shown in FIG. 7, the horizontal central axis ab has a tilt angle φ1 toward bottom left, and the horizontal central axis after tilted is represented by a'b'; a angle φ1 is formed between ab and a'b'. The transmitting point a' transmits infrared light in a horizontal direction, and the infrared light is received by a receiving point c' on a lower edge; a'c' and a'b' have an included angle, represented by φ2. The receiving point c' is represented by c before tilted. If ab and a'c' are parallel, then the included angle φ1 equals to the included angle φ2; since the included angle φ2 is within the triangle a'b'c', moreover, the shape of the glasses is defined, and the position of a'b'c' is also defined, according to a geometrical relationship, the value of the included angle φ2 can be obtained, that is, the tilt angle φ1 is obtained.

The infrared sensing receiver 18 feeds the tilt angle φ1 to the signal module 16, and according to the tilt angle φ1, the signal module 16 adjusts the pulsed electric-current signal provided, and causes the left and right coils 151,152 to change the generated magnetic field, and the magnetic field causes the polarization planes of the polarized lights entering the left and right transparent magneto-optical thin films 131,132 to rotate; at this moment, the rotation angle of the polarization plane of the polarized light is a Faraday rotation angle which can compensate for the tilt angle φ1 of the 3D glasses, so that the polarization planes of the polarized lights are rotated to orientations actually needed. For example, when the 3D glasses requires that the left magneto-optical eyeglass 121 is opened while the right magneto-optical eyeglass 122 is shut, since the 3D glasses has a tilt angle φ1, the direction of the light-transmitting axes of the rear polarizers also have the tilt angle φ1, now the rotation angle of the polarization plane of the polarized light entering the left transparent magneto-optical thin film 131 is changed from 90° into a Faraday rotation angle (90°±φ1) which can compensate for the tilt angle φ1, whereas the rotation angle of the polarization plane of the polarized light entering the right transparent magneto-optical thin film 132 is changed from 0° into a Faraday rotation angle (0°±φ1) which can compensate for the tilt angle φ1, so that finally, the polarization plane of the polarized light entering the left transparent magneto-optical thin film 131 is parallel with the direction of the light-transmitting axis of the left rear polarizer 141, whereas the polarization plane of the polarized light entering the right transparent magneto-optical thin film 132 is vertical to the direction of the light-transmitting axis of the right rear polarizer 142, thereby achieving a state of the 3D glasses such that the left magneto-optical eyeglass 121 is opened while the right magneto-optical eyeglass 122 is shut. Also, a state of the 3D glasses such that the left magneto-optical eyeglass 121 is opened while the right magneto-optical eyeglass 122 is shut, can be obtained analogically, which is no more described here.

With the active-shutter 3D glasses provided by the embodiment of the present invention, according to the pulsed electric-current signals provided by the signal modules 161,162, the left and right coils 151,152 cause the polarization planes of the polarized light entering the left and right transparent magneto-optical thin films 131,132 to rotate, respectively, so that the left and right magneto-optical eyeglasses 121,122 alternately repeat the procedure that the left magneto-optical eyeglass 121 is opened while the right magneto-optical eyeglass 122 is shut and then the left magneto-optical eyeglass 121 is shut while the right magneto-optical eyeglass 122 is opened, thereby achieving a 3D display effect. Compared with the prior art in which an optical rotation is performed by liquid crystal molecules in liquid crystal screen eyeglasses, an embodiment of the present invention achieves a 3D display by utilizing a magneto-optical rotation effect, so that the active-shutter 3D glasses has a simple structure and does not need to encapsulate liquid crystal; therefore, it has a higher safety and higher comfort level, offering a user a better 3D effect. When the 3D glasses is tilted, by utilizing the infrared sensing transmitter and receiver to uniquely determine the tilt angle of the 3D glasses, and feeding the tilt angle to the signal module, the magnetic field can, based on the actual position of the 3D glasses, cause the polarization plane of the incident polarized light to rotate, so as to accomplish a 3D display; in this way, the 3D glasses when tilted can still allow a user to normally watch a 3D video/image.

In order to explain the above apparatus, an embodiment of the present invention further provides a operating method of the above-described active-shutter 3D glasses, and the operating method comprises:

step 101, the signal module provides an electric-current signal to the magnetic field apparatus;

step 102, the magnetic field apparatus generates a magnetic field corresponding to the electric-current signal;

step 103, the generated magnetic field causes the polarization planes of the polarized light entering the left and right transparent mediums to rotate, respectively, so that at the same moment, the polarized light entering one of the transparent mediums passes through its corresponding rear polarizer, whereas the polarized light entering the other of the left and right transparent mediums can not pass through its corresponding rear polarizer, and at the next moment, the polarized light entering the transparent medium whose corresponding rear polarizer the polarized light at a previous moment passed through is not allowed to pass through its corresponding rear polarizer, whereas the polarized light entering the transparent medium whose corresponding rear polarizer the polarized light at a previous moment can not be passed through is allowed to pass through its corresponding rear polarizer.

With the active-shutter 3D glasses provided by the embodiment of the present invention, according to an electric-current signal provided by the signal module, the magnetic field apparatus generates a corresponding magnetic field, which causes the polarization planes of the polarized light entering the left and right transparent mediums to rotate, respectively, so that at the same moment, one of the eyeglass is light-transmissive while the other is non-light-transmissive, and at the next moment, the eyeglass which was light-transmissive at a previous moment is non-light-transmissive while the eyeglass which was non-light-transmissive at the previous moment is light-transmissive; thus, by alternately repeating the above-described process, a 3D display effect is achieved. Compared with the prior art in which an optical rotation is performed by liquid crystal molecules in liquid crystal screen eyeglasses, an embodiment of the present invention achieves a 3D display by utilizing a magneto-optical rotation effect, so that the active-shutter 3D glasses has a simple structure and does not need to encapsulate liquid crystal; therefore, it has a higher safety and higher comfort level, offering a user a better 3D effect.

Optionally, the magnetic field apparatus comprises left and right coils, and the step 101 comprises:

the signal module provides an electric-current signal for the left coil and an electric-current signal for the right coil, respectively;

Then the step 102 comprises:

the left coil generates a left magnetic field corresponding to the respective electric-current signal, and the right coil generates a right magnetic field corresponding to the respective electric-current signal.

The magnetic field generated by the magnetic field apparatus by means of the coils, is uniformly distributed and uniform in orientation and intensity, and has a good optical rotation effect; moreover, the coils may be surroundingly placed outside the peripheries of the magneto-optical eyeglasses to function as a frame, thus there is no need to provide a frame additionally, thereby allowing the active-shutter 3D glasses to have a better 3D display effect and a more compact configuration.

Optionally, the step 101 comprises:

the signal module provides a pulsed electric-current signal to the magnetic field apparatus.

Optionally, before the step 101, the method further comprises:

step 201, the infrared sensing transmitter transmits infrared light in a predetermined direction;

step 202, the infrared sensing receiver receives the transmitted infrared light;

step 203, the infrared sensing receiver obtains a tilt angle according to the transmitting position and the receiving position of the infrared light, and feeds the tilt angle to the signal module, so that the signal module adjusts the electric-current signal according to the tilt angle, so as to cause the magnetic field apparatus to change the magnetic field; the magnetic field consequently causes the polarization plane of the polarized light entering the transparent medium to rotate, and at this time, the rotation angle of the polarization plane of the polarized light is a Faraday rotation angle which can compensate for the tilt angle of the 3D glasses, so that the polarization plane of the polarized light is caused to rotate to an orientation actually needed.

By utilizing the infrared sensing transmitter and receiver to uniquely determine the tilt angle of the 3D glasses, and feeding the tilt angle to the signal module, the magnetic field can, based on the actual position of the 3D glasses, cause the polarization plane of the incident polarized light to rotate, so as to accomplish a 3D display; in this way, the 3D glasses when tilted can still allow a user to normally watch a 3D video/image.

It should be understood by those skilled in the art that various changes and modifications may be made in these embodiments without departing from the scope and spirit of the present invention. If these changes and modifications fall into the range of the claims and their equivalents, the present invention also is directed to include these changes and modifications.

What is claimed is:

1. An active-shutter 3D glasses, comprising:
a frame, comprising temples;
left and right magneto-optical eyeglasses, supported by the frame, and comprising left and right transparent mediums and left and right rear polarizers, respectively;
a magnetic field apparatus, located outside the left and right magneto-optical eyeglasses, and providing the left and right magneto-optical eyeglasses with a magnetic field which causes polarization planes of polarized light entering the left and right magneto-optical eyeglasses to rotate; and
a signal module, connected with the magnetic field apparatus, and providing a electric-current signal to the magnetic field apparatus so that the magnetic field corresponds to the electric-current signal, and the electric-current signal is changed so that the magnetic field which rotates the polarized light is induced,
wherein the generated magnetic field causes the polarization planes of the polarized light entering the left and right transparent mediums to rotate, respectively,
wherein the left and right magneto-optical eyeglasses are not a liquid crystal eyeglass,
the left and right transparent mediums are transparent mediums with a predetermined Verdet constant
wherein the active-shutter 3D glasses further comprising an infrared sensing transmitter and an infrared sensing receiver; the infrared sensing receiver is connected with the signal module; the infrared sensing transmitter transmits infrared light in a predetermined direction, and the infrared sensing receiver receives the transmitted infrared light, and according to the transmitting position and the receiving position of the infrared light, obtains a tilt angle of the active-shutter 3D glasses, and feeds the tilt angle to the signal module, so that the signal module adjusts the electric-current signal according to the tilt angle, so as to cause the magnetic field apparatus to change the magnetic field; and
wherein the absolute value of the Verdet constant of the left and right transparent mediums is greater than 0.3 min/(Oe·cm).

2. The active-shutter 3D glasses according to claim 1, wherein the signal module is located on the frame.

3. The active-shutter 3D glasses according to claim 1, wherein at a first moment, the polarized light entering the transparent medium of one of the left and right magneto-optical eyeglasses passes through its corresponding rear polarizer, whereas the polarized light entering the transparent medium of the other of the left and right magneto-optical eyeglasses can not pass through its corresponding rear polarizer; and at a second moment just subsequent to the first moment, the polarized light entering the transparent medium whose corresponding rear polarizer the polarized light at a previous moment passed through is not allowed to pass through its corresponding rear polarizer, whereas the polarized light entering the transparent medium whose corresponding rear polarizer the polarized light at the previous moment could not pass through is allowed to pass through its corresponding rear polarizer.

4. The active-shutter 3D glasses according to claim 1, wherein the time interval between the first moment and the second moment is not greater than a visual persistence time of a human eye.

5. The active-shutter 3D glasses according to claim 1, wherein the left and right transparent mediums are transparent magneto-optical glass, transparent diluted magnetic semiconductor thin films or transparent magneto-optical thin films.

6. The active-shutter 3D glasses according to claim 1, wherein the magnetic field apparatus tightly surrounds the left and right magneto-optical eyeglasses.

7. The active-shutter 3D glasses according to claim 1, wherein the magnetic field apparatus comprises left and right coils; the left coil is surroundingly placed outside the periphery of the left magneto-optical eyeglass, and the right coil is surroundingly placed outside the periphery of the right magneto-optical eyeglass.

8. The active-shutter 3D glasses according to claim 1, wherein the electric-current signal is a pulsed electric-current signal.

9. The active-shutter 3D glasses according to claim 1, wherein the left or the right magneto-optical eyeglass comprises a flat and straight edge; the infrared sensing transmitter is provided on the flat and straight edge, and the infrared sensing receiver is arranged on any other edge of the left or the right magneto-optical eyeglass except for the flat and straight edge.

10. An operating method of an active-shutter 3D glasses, the active-shutter 3D glasses, comprising: a frame, comprising temples; left and right magneto-optical eyeglasses, supported by the frame, and comprising left and right transparent mediums and left and right rear polarizers, respectively; a magnetic field apparatus, located outside the left and right magneto-optical eyeglasses, and providing the left and right magneto-optical eyeglasses with a magnetic field which causes polarization planes of polarized light entering the left and right magneto-optical eyeglasses to rotate; and a signal module, connected with the magnetic field apparatus, and providing an electric-current signal to the magnetic field apparatus so that the magnetic field corresponds to the electric-current signal, and the electric-current signal is changed so that the magnetic field which rotate the polarized light is induced, wherein the generated magnetic field causes the polarization planes of the polarized light entering the left and right transparent mediums to rotate, respectively, and the left and right magneto-optical eyeglasses are not a liquid crystal eyeglass, and the operating method, comprising:
step 101, the signal module provides an electric-current signal to the magnetic field apparatus;
step 102, the magnetic field apparatus generates a magnetic field corresponding to the electric-current signal; and
step 103, the generated magnetic field causes the polarization planes of the polarized light entering the left and right transparent mediums to rotate, respectively,
wherein the left and right transparent mediums are transparent mediums with a predetermined Verdet constant
wherein the active-shutter 3D glasses further comprises an infrared sensing transmitter and an infrared sensing receiver, and before the step 101, the method further comprises:

step 201, the infrared sensing transmitter transmits infrared light in a predetermined direction;

step 202, the infrared sensing receiver receives the transmitted infrared light;

step 203, the infrared sensing receiver obtains a tilt angle according to the transmitting position and the receiving position of the infrared light, and feeds the tilt angle to the signal module, so that the signal module adjusts the electric-current signal according to the tilt angle, so as to cause the magnetic field apparatus to change the magnetic field; the magnetic field consequently causes the polarization plane of the polarized light entering the transparent medium to rotate, and at this time, the rotation angle of the polarization plane of the polarized light is a Faraday rotation angle which can compensate for the tilt angle of the 3D glasses, so that the polarization plane of the polarized light is caused to rotate to an orientation actually needed, wherein the absolute value of the Verdet constant of the left and right transparent mediums is greater than 0.3 min/(Oe·cm).

11. The operating method of the active-shutter 3D glasses according to claim 10, wherein at a first moment, the polarized light entering the transparent medium of one of the left and right magneto-optical eyeglasses passes through its corresponding rear polarizer, whereas the polarized light entering the other transparent medium can not pass through its corresponding rear polarizer; and at a second moment just subsequent to the first moment, the polarized light entering the transparent medium whose corresponding rear polarizer the polarized light at a previous moment passed through is not allowed to pass through its corresponding rear polarizer, whereas the polarized light entering the transparent medium whose corresponding rear polarizer the polarized light at the previous moment could not pass through is allowed to pass through its corresponding rear polarizer.

12. The operating method of the active-shutter 3D glasses according to claim 10, wherein the magnetic field apparatus comprises: left and right coils, provided outside the left and right magneto-optical eyeglasses, respectively; the step 101 comprises a step as follows: the signal module provides an electric-current signal for the left coil and an electric-current signal for the right coil, respectively; the step 102 comprises a step as follows: the left coil generates a left magnetic field corresponding to the respective electric-current signal, and the right coil generates a right magnetic field corresponding to the respective electric-current signal.

13. The operating method of the active-shutter 3D glasses according to claim 10, wherein the step 101 comprises a step as follows: the signal module provides a pulsed electric-current signal to the magnetic field apparatus.

\* \* \* \* \*